United States Patent
Reiter et al.

(10) Patent No.: US 7,857,346 B2
(45) Date of Patent: Dec. 28, 2010

(54) SAFETY ARRANGEMENT

(75) Inventors: Thomas Reiter, Vierkirchen (DE);
Albert Jörg, Germering (DE);
Karl-Heinz Sommer, Stockdorf (DE);
Klaus-Peter Kühne, Karlsfeld (DE);
Marc Schock, Dachau (DE); Marcus Weber, Untertheres (DE)

(73) Assignee: Autoliv Development AB, Vargarda (SE)

( * ) Notice: Subject to any disclaimer, the term of this patent is extended or adjusted under 35 U.S.C. 154(b) by 67 days.

(21) Appl. No.: 11/992,153

(22) PCT Filed: Sep. 26, 2006

(86) PCT No.: PCT/SE2006/001086

§ 371 (c)(1),
(2), (4) Date: Mar. 17, 2008

(87) PCT Pub. No.: WO2007/046740

PCT Pub. Date: Apr. 26, 2007

(65) Prior Publication Data

US 2009/0115176 A1 May 7, 2009

(30) Foreign Application Priority Data

Oct. 18, 2005 (GB) ................................. 0521165.1

(51) Int. Cl.
*B60R 21/16* (2006.01)
*B60R 21/205* (2006.01)
(52) U.S. Cl. ................. 280/743.2; 280/730.1; 280/732; 280/743.1
(58) Field of Classification Search ............. 280/730.1, 280/732, 743.1, 743.2
See application file for complete search history.

(56) References Cited

U.S. PATENT DOCUMENTS 5,280,953 A * 1/1994 Wolanin et al. ............. 280/739

(Continued)

FOREIGN PATENT DOCUMENTS

| EP | 0652139 A1 | 5/1995 |
| EP | 1193136 A2 | 4/2002 |
| GB | 2369328 A | 5/2002 |
| WO | 02/43993 A1 | 6/2002 |
| WO | 2005/061286 A1 | 7/2005 |

OTHER PUBLICATIONS

International Search Report and Written Opinion for PCT/SE2006/001086, mailed Jan. 22, 2007.
UK Search Report for GB0521165.1, dated Dec. 15, 2005.

*Primary Examiner*—Paul N. Dickson
*Assistant Examiner*—Barry Gooden, Jr.
(74) *Attorney, Agent, or Firm*—Harness, Dickey & Pierce, P.L.C.

(57) ABSTRACT

A safety arrangement for a motor vehicle is disclosed which comprises an air-bag module (1) having an inflatable air-bag (5) in fluid communication with an inflator (4). An internal tether (14) is provided having a first end (15) and a second end (16). The first end (15) of the tether is connected to a restrainable part (13) of the air-bag, whilst the second end (16) of the tether is free from connection with the air-bag but is initially trapped between the folds or rolls of an initially folded or rolled part of the air-bag. The arrangement is such that, upon inflation of the air-bag, the tether serves to restrain the restrainable part (13) of the air-bag until such time as the folded or rolled part of the air-bag (9) becomes sufficiently unfolded or unrolled to release the second end (16) of the tether (14).

18 Claims, 7 Drawing Sheets

U.S. PATENT DOCUMENTS

| | | | |
|---|---|---|---|
| 5,762,367 A * | 6/1998 | Wolanin .................... | 280/736 |
| 6,422,597 B1 * | 7/2002 | Pinsenschaum et al. ..... | 280/735 |
| 6,425,603 B1 * | 7/2002 | Eschbach ................. | 280/743.2 |
| 6,561,545 B2 * | 5/2003 | Greib et al. .............. | 280/743.2 |
| 6,592,146 B2 * | 7/2003 | Pinsenschaum et al. .. | 280/743.2 |
| 6,736,426 B2 * | 5/2004 | Winters et al. ........... | 280/743.2 |
| 6,883,831 B2 * | 4/2005 | Hawthorn et al. .......... | 280/739 |
| 2002/0036400 A1 | 3/2002 | Winters et al. | |
| 2003/0057691 A1 | 3/2003 | Tokita et al. | |
| 2005/0023811 A1 | 2/2005 | Thomas | |
| 2005/0057029 A1 | 3/2005 | Thomas | |
| 2005/0127653 A1 | 6/2005 | Williams et al. | |

* cited by examiner

SAFETY ARRANGEMENT

CROSS-REFERENCE TO RELATED APPLICATIONS

This application is a 371 National Stage of International application No. PCT/SE2006/001086, filed Sep. 26, 2006 and published in English as WO 2007/046740 A1 on Apr. 26, 2007. This application claims priority to GB 0521165.1, filed Oct. 18, 2005, which application is herein expressly incorporated by reference.

THE PRESENT INVENTION relates to a safety arrangement and more particularly relates to a safety arrangement for a motor vehicle in order to provide protection for a passenger in the motor vehicle.

It has been proposed to provide an air-bag located in front of a passenger in a motor vehicle, the air-bag being arranged to be inflated in the event of an impact involving the vehicle in order to provide protection for the occupant.

It is known that whilst such an air-bag may provide good protection for an occupant who, at the instant of impact, is sitting in an "ordinary" position, it has been found that the air-bag may actually injure a seat occupant who, at the moment of impact, is not in the "ordinary" position, but, instead, might be leaning forwards, for example, to gain access to a glove box mounted in the dashboard of a motor vehicle.

It has therefore been proposed previously that an arrangement should be provided to detect when a vehicle occupant is out of the ordinary position and to moderate inflation of the air-bag, or even inhibit inflation of the air-bag, in such a situation, in order to reduce the risk of the air-bag itself injuring the occupant. Various such proposals have been proposed previously which involve the use of detectors to detect when a vehicle occupant is out of position, the detectors being in some way operatively connected to the air-bag in order that the inflation of the air-bag can be controlled in dependence upon signals received from the detectors. Such an arrangement can therefore be considered to represent an "active" system in the sense that it actively monitors the position of a vehicle occupant.

In some instances, it is considered desirable to provide a safety arrangement in which an air-bag is configured to inflate in such a manner as to avoid significant injury to an "out-of-position" occupant without the need for complicated and expensive detector or sensor arrangements.

The present invention seeks to provide an improved a safety arrangement for a motor vehicle.

According to this invention, there is provided a safety arrangement for a motor vehicle, the safety arrangement comprising: an airbag module having an inflatable airbag in fluid communication with an inflator configured to inflate the airbag, wherein the airbag is provided with at least one internal tether having a first end and a second end, part of the tether in the region of the first end being connected either directly or indirectly to a restrainable part of the airbag, and part of the tether in the region of the second end being free from connection with the airbag, at least part of the airbag being initially folded or rolled to form folds or rolls between which the second end of the tether is trapped, the arrangement being such that, upon inflation of the airbag, the tether serves to restrain said restrainable part of the airbag until such time as the folded or rolled part of the airbag becomes sufficiently unfolded or unrolled to release the second end of the tether.

Preferably, the safety arrangement is provided in a motor vehicle and configured such that, upon inflation of the airbag, the restrainable part of the airbag will lie substantially adjacent the windscreen of the vehicle, and the folded or rolled part of the airbag will move towards a front-seat occupant of the vehicle, as the folded or rolled part of the airbag unfolds or unrolls.

Advantageously, the part of the tether in the region of the first end is indirectly connected to the restrainable part of the airbag via a restraint element, the restraint element being attached to the first end of the tether and to the airbag.

Conveniently, the restraint element comprises a panel which is secured to the airbag in the region of the restrainable part.

Preferably, the restraint element comprises a panel which is secured to the airbag in the region of the restrainable part.

Advantageously, the tether passes through a fixed guide aperture formed through part of the airbag module.

Conveniently, the restraint element extends inwardly of the airbag from the restrainable part of the airbag and is secured to a fixed part of the airbag module.

Preferably, the part of the tether in the region of the first end is connected directly to the restrainable part of the airbag.

Advantageously, the part of the tether is bifurcated so as to define two branches, each having a respective said first end connected directly to the restrainable part of the airbag.

Conveniently, the airbag is provided with at least one eyelet on its inner surface, the tether passing through the or each eyelet.

Preferably, the safety arrangement comprises a plurality of said eyelets, the tether being connected to the restraint element at respective points along its length between adjacent eyelets.

Advantageously, each said branch passes through a respective eyelet.

In order that the present invention may be more readily understood, and so that further features thereof maybe appreciated, embodiments of the invention may now be described, by way of example, with reference to the accompanying drawings, in which:—

Figure 1:
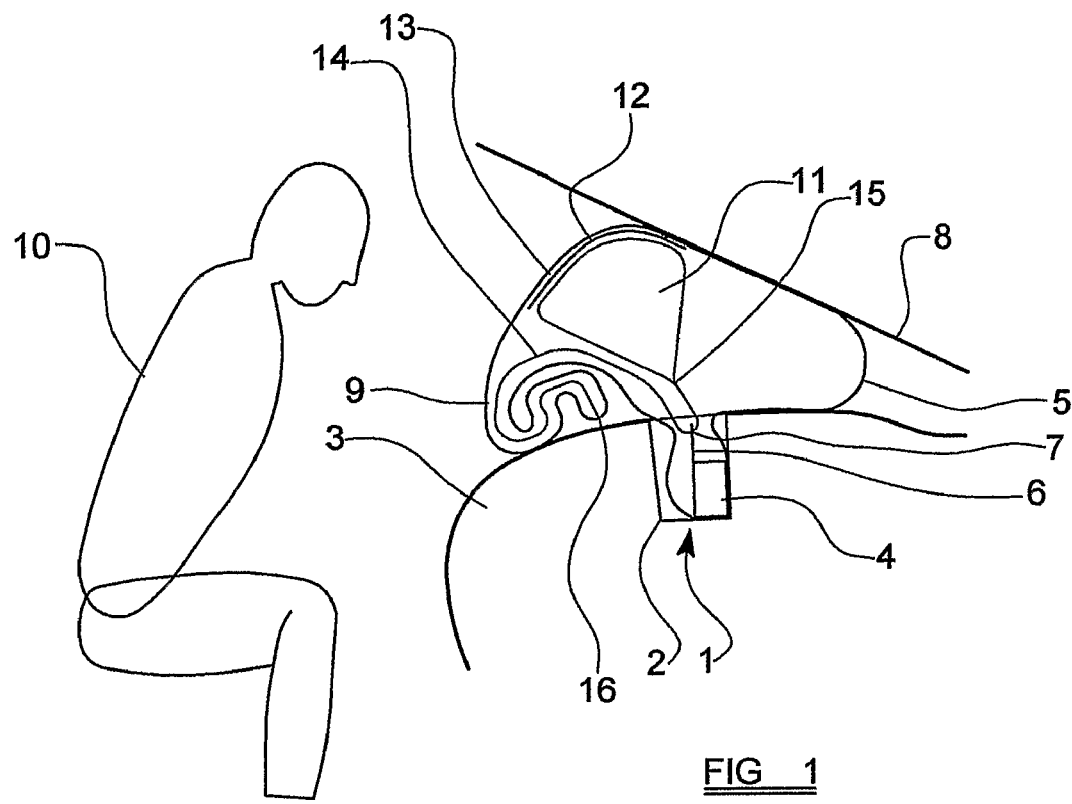
FIG. 1 is a schematic cross-sectional illustration showing a safety arrangement in accordance with the first embodiment of the present invention, during an initial stage of deployment, in which an air-bag is partially inflated.

Referring initially to FIG. 1, there is illustrated a first embodiment of a safety arrangement in accordance with the present invention, showing the arrangement during an initial stage of its deployment.

The safety arrangement illustrated in FIG. 1 comprises an air-bag module 1 which comprises a housing 2 which is shown mounted in the upper part of the dashboard 3 of a motor vehicle. However, it should be appreciated that the present invention can find application in other regions of a motor vehicle, not only in the dashboard region. Nevertheless, for the reasons of simplicity, the present invention will be described hereinafter with specific reference to an installation mounted in the dashboard of a motor vehicle.

The air-bag module 1 further comprises an inflator 4 which may, for example, take the form of a gas generator of a type known per se. The inflator is mounted within the housing 2 and is provided in fluid communication with an inflatable air-bag 5.

A deflector 6 is provided which is mounted generally adjacent an exit port of the inflator 4 and which is configured to direct the flow of inflating gas from the inflator 4 into the air-bag 5 in an appropriate manner. The free end of the deflector 6 which is located towards the uppermost surface of the dashboard 3, is provided with a guide aperture 7, the purpose of which will be described in more detail hereinafter. It should be appreciated that the guide aperture 7 is fixed by virtue of being provided through the gas deflector 6 which is fixed with respect to the housing 2 of the air-bag module 1.

As will be appreciated by those of skill in the art, the air-bag 5 is initially packed, for example by folding, rolling of a combination of both, so as to reside entirely within the housing 2 which, in normal use, is covered by a region of dashboard trim (not shown) in a manner known per se. FIG. 1 illustrates the air-bag 5 in a condition after actuation of the inflator 4, during the initial stages of inflation of the air-bag 5.

During the early stages of inflation of the air-bag 5, the upper region of the air-bag quickly bears against the undersurface of the vehicle's windscreen 8, this occurring at an instant before the air-bag 5 becomes entirely unfolded or unrolled from its packed condition. Indeed, FIG. 1 shows part 9 of the air-bag 5, which is located closest to a front-seat occupant 10 of the motor vehicle, still folded.

A restraint element 11 is provided within the air-bag 5, which takes a generally "parachute-shaped" form presenting a forwardly-directed panel which is secured, for example via an area of stitching 12 to the inner surface of the air-bag 5 in a region which, at the instant of inflation illustrated in FIG. 1, lies substantially adjacent the windscreen 8, above the folded part 9. The region of the air-bag 5 to which the restraint element 11 is thus connected defines a restrainable part 13 of the air-bag.

The restraint element 11 extends inwardly from the restrainable part 13 of the air-bag, towards the housing 2 of the air-bag module 1.

In addition to the restraint element 11, the interior of the air-bag 5 is provided with an internal tether 14 which is flexible and which has a first end 15 and a second end 16. The first end 15 of the tether is attached to the innermost region of the restraint element 11, and the tether 14 extends from this point of attachment towards the housing 2 where is passes through the guide aperture 7 formed through the deflector 6. From here, the tether 14 extends towards the folded part 9 of the air-bag. The end region of the tether 14 follows a tortuous or serpentine path between adjacent folds within the folded part 9 of the air-bag such that the second end 16 of the tether, which is free from connection with the air-bag, is initially trapped between the folds of the folded part 9.

During the initial stages of deployment of the air-bag 5, as illustrated in FIG. 1, the second end 16 of the tether 14 remains trapped within the folds of the folded part 9. By virtue of the indirect connection of the first end 15 of the tether, via the restraint element 11, to the restrainable part 13 of the air-bag, the tether 14 is thus effective to restrain the restrainable part 13 of the air-bag from further movement towards the occupant 10.

FIG. 1 illustrates the occupant 10 in a position in which, due to the inertial forces of an impact, the occupant's torso has begun to move forwardly with respect to the dashboard 3, but from a generally "ordinary" seating position. It will therefore be seen that there is sufficient space between the occupant 10 and the air-bag 5 for the folded part 9 of the air-bag to inflate further, and this will be described in more detail hereinafter. However, it should be appreciated that if the occupant 10 were to be "out of position" for example being located significantly closer to the dashboard 3 (which perhaps might be the case if the occupant were attempting to retrieve something from the glove box of the motor vehicle) then the result would be that the folded part 9 of the air-bag would not have sufficient space to become completely unfolded. In this situation, therefore, because the folded part 9 of the air-bag is prevented from unfolding completely, the second end 16 of the tether 14 remains trapped between the folds of the air-bag and hence the tether 14 prevents the restrainable part 13 of the air-bag moving further towards the seat occupant 10. This is important in preventing the upper region of the air-bag advancing too far towards the "out-of-position" occupant, thereby avoiding possible injury to the occupant.

Figure 2:
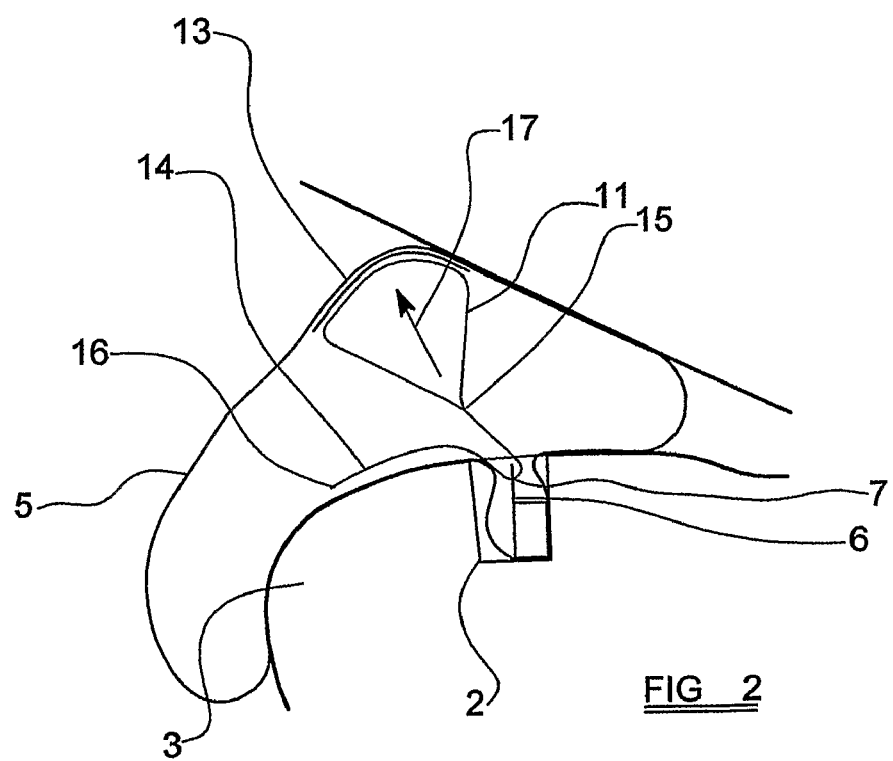
FIG. 2 is a view corresponding generally to FIG. 1 showing a subsequent stage of deployment, in which the air-bag is substantially fully inflated.

FIG. 2 illustrates the air-bag 5 in a substantially fully inflated condition in which the unfolded part 9 illustrated in FIG. 1 has been allowed to become completely unfolded due to sufficient spacing of the occupant 10 from the dashboard 3. Due to the unfolding of the folded part 9, the second end 16 of the tether 14 has become released thereby allowing the restrainable part 13 of the air-bag to advance further towards the occupant 10, and away from the housing 2, as illustrated by arrow 17. Because the restraint element 11 is permanently secured to the inner surface of the restrainable part 13 of the air-bag, and is also permanently attached to the first end 15 of the tether 14, the tether 14 is allowed to run through the guide aperture 7 formed through the gas deflector 6.

Figure 3:
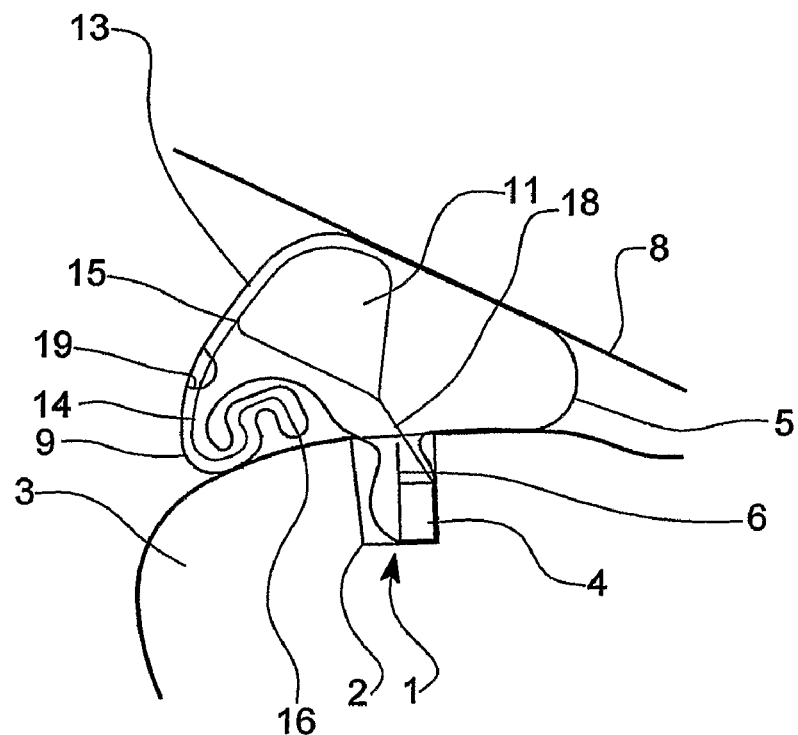
FIG. 3 is a schematic cross-sectional illustration showing a safety arrangement in accordance with a second embodiment of the present invention during an initial stage of deployment, in which an air-bag is partially inflated.

FIG. 3 illustrates a second embodiment of the present invention, showing the arrangement during an initial stage of deployment in which the air-bag is partially inflated. This arrangement shares several components with the arrangement described above with reference to FIGS. 1 and 2 and the same reference numerals will therefore be used for the sake of simplicity.

The arrangement illustrated in FIG. 3 differs from that illustrated in FIGS. 1 and 2 in a number of respects. Firstly, the gas deflector 6 in the arrangement of FIG. 3 is not provided with any guide aperture and, indeed, the tether 14 does not pass through any part of the gas deflector 6.

The restraint element 11 of the arrangement shown in FIG. 3 is of generally similar form to that used in the arrangement illustrated in FIGS. 1 and 2, but in this arrangement, the innermost region of the restraint element 11 is permanently secured, by a cord 18 to a fixed part of the air-bag housing 2.

The tether 14 of the arrangement illustrated in FIG. 3 is connected at its first end 15 to a region of the restraint element 11 located adjacent the restrainable part 13 of the air-bag 5 and, from this point, extends through an eyelet 19 provided on the inner surface of the air-bag 5. The tether 14 extends from the eyelet 19 into the folded part 9 of the air-bag in a manner generally identical to that of FIG. 1 such that the second end 16 of the tether is again trapped within the folds of the air-bag 5.

In the event that the folded region 9 of the air-bag is prevented from completely unfolding due to the proximity of an "out-of-position" occupant, then the tether 14 serves to prevent further movement of the restrainable part 13 of the air-bag away from the region of the air-bag provided with the internal eyelet 19. However, as illustrated in FIG. 4, if the folded part 9 of the air-bag is allowed to become completely unfolded due to the vehicle occupant being spaced sufficiently from the dashboard 3 for it to be safe to allow complete inflation of the air-bag 5, then the second end 16 of the tether 14 becomes free such that the tether 14 is allowed to pay out through the eyelet 19, thus allowing the restrainable part 13 of the air-bag to move away from the eyelet 19 so that that region of the air-bag can inflate further as indicated generally by arrow 20.

Figure 4:
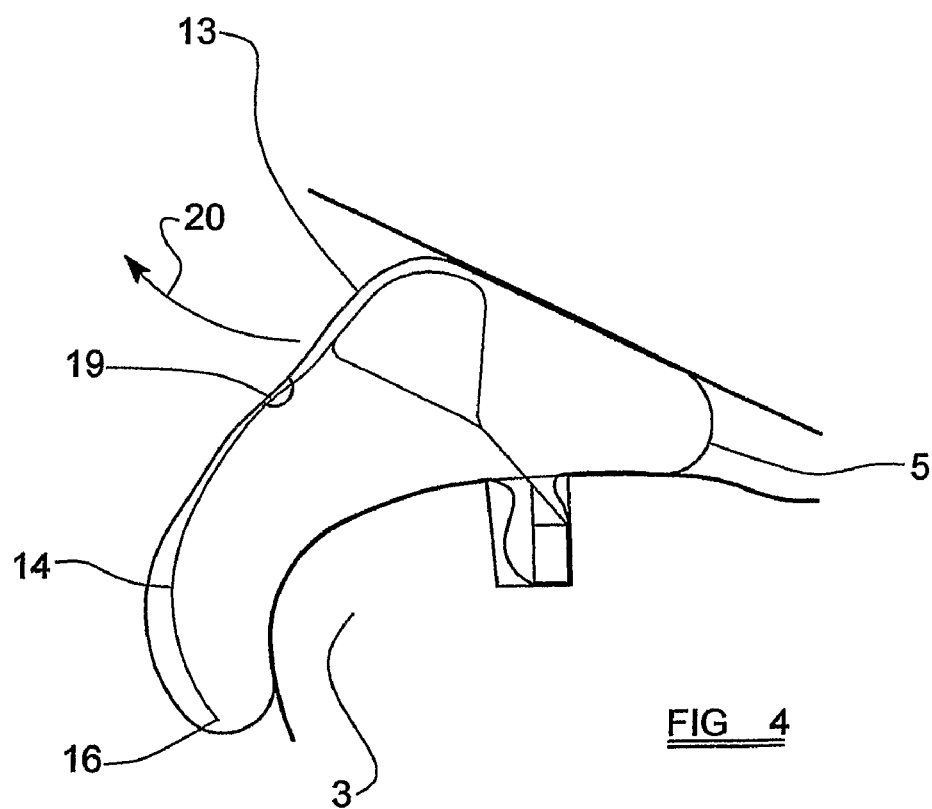
FIG. 4 is a view corresponding generally to FIG. 3, illustrating a subsequent stage of deployment, in which the air-bag is substantially fully inflated.
Figure 5:
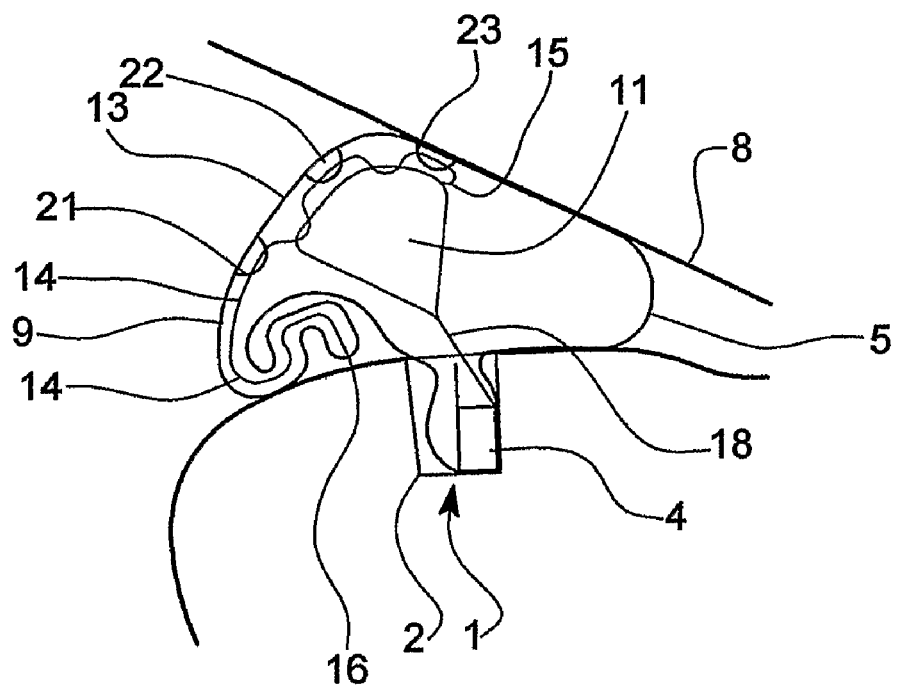
FIG. 5 is a schematic cross-sectional illustration showing a safety arrangement in accordance with a third embodiment of the present invention during an initial stage of deployment, in which an air-bag is partially inflated.
Figure 6:
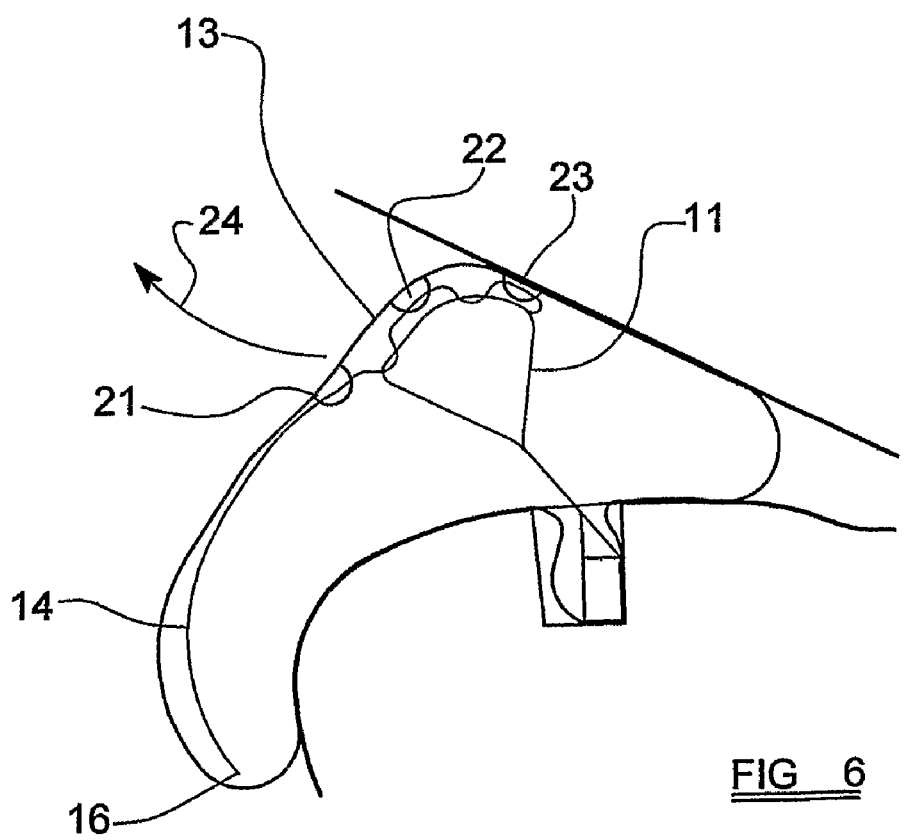
FIG. 6 is a view corresponding generally to FIG. 5, showing a subsequent stage of deployment, in which the air-bag is substantially fully inflated.

FIGS. 5 and 6 illustrate a further embodiment of the present invention which represents a variation of the arrangement shown in FIGS. 3 and 4. In the arrangement of FIGS. 5 and 6, the air-bag 5 is provided with three internal eyelets 21, 22, 23, the first eyelet 21 being located in generally the same region of the air-bag as the eyelet 19 of the embodiment illustrated in FIGS. 3 and 4. The second eyelet 22 is located in the region of the restrainable part 13 of the air-bag, and the third eyelet 23 is located in a region of the air-bag effective to bear against the windscreen 8 during an early stage of deployment of the air-bag.

The restraint element 11 is again permanently secured, by way of a cord 18, to a fixed part of the housing 2 of the air-bag module 1. However, in this embodiment, the forwardmost panel-part of the restraint element 11 is not secured directly to the inner surface of the air-bag in the region of the restrainable part 13. Instead, the tether 14 serves to interconnect the forwardmost part of the restraint element 11 and the restrainable part 13 of the air-bag. The tether 14 extends from the first eyelet 21, through part of the restraint element 11 before passing through the second eyelet 22 and then passing again through another part of the restraint element 11 before passing through the final eyelet 23 and being connection, at its first end 15, to another region of the restraint element 11. By virtue of passing alternately through the eyelets 21, 22, 23, the tether 14 can be considered to be secured indirectly to the air-bag 5.

During deployment of the air-bag 5 of the embodiment illustrated in FIGS. 5 and 6, the air-bag behaves generally similar to the manner in which the air-bag of the arrangement illustrated in FIGS. 3 and 4 behaves. In the event that the folded part 9 of the air-bag is prevented from substantially complete unfolding due to the proximity of an "out-of-position" occupant, then the second end 16 of the tether remains trapped within the folds of the air-bag so that the tether 14 is effective, by virtue of its interconnection between the eyelets 21, 22, 23, and the restraint element 11, to restrain the restrainable part of the air-bag 13 against further movement towards the occupant. However, in the event that the folded part 9 of the air-bag is allowed to become completely unfolded, as illustrated in FIG. 6, then the second end 16 of the tether 14 becomes released, thereby allowing the tether 14 to pay out through the eyelets, allowing the restrainable part 13 of the air-bag to move away from the forwardmost part of the restraint element 11 and hence advance further towards the seat occupant in the general direction illustrated by arrow 24.

Figure 7:
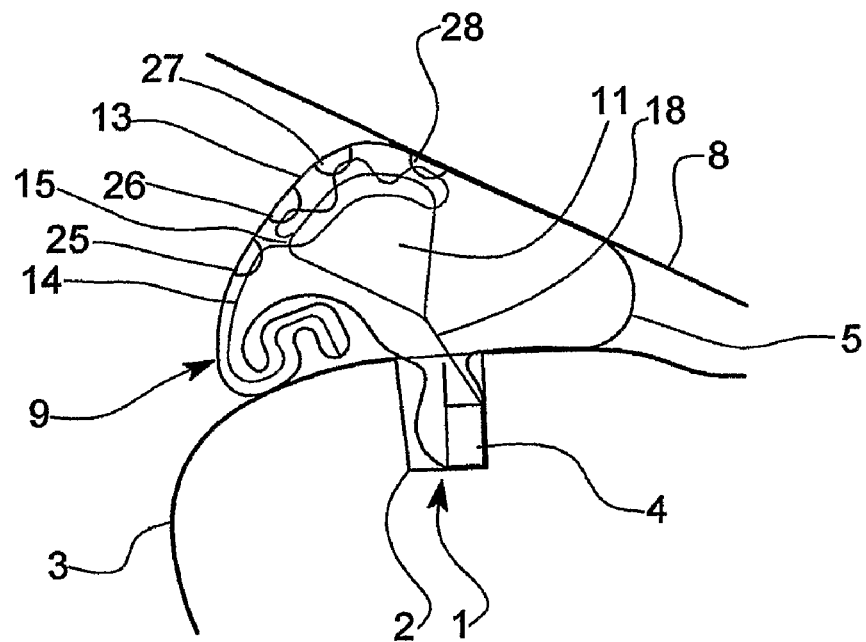
FIG. 7 is a schematic cross-sectional illustration showing a safety arrangement in accordance with a fourth embodiment of the present invention during an initial stage of deployment, in which an air-bag is partially inflated.
Figure 8:
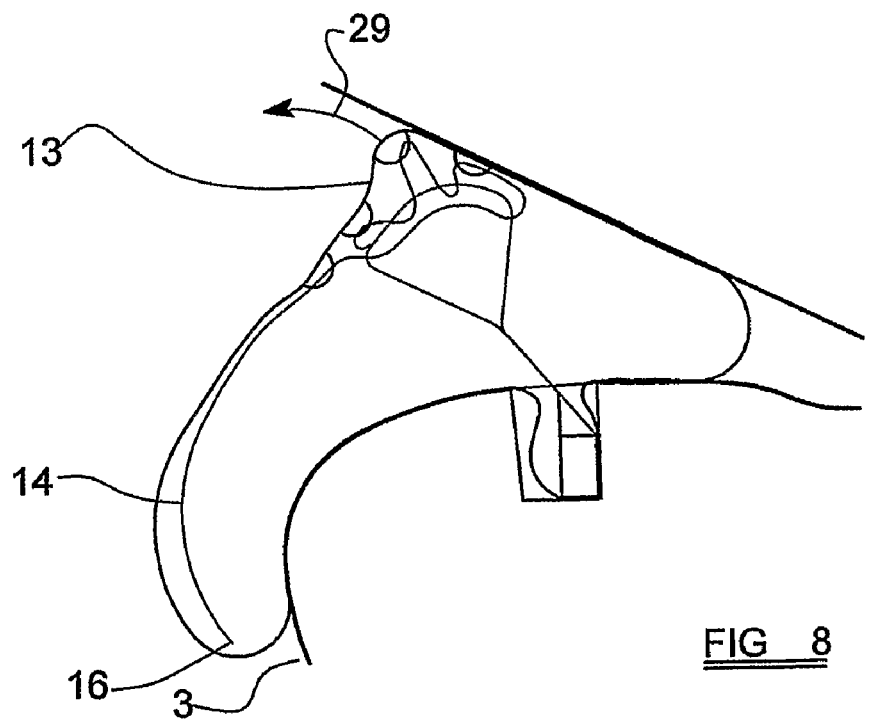
FIG. 8 is a view corresponding generally to FIG. 7 illustrating a subsequent stage of deployment, in which the air-bag is substantially fully inflated.

Turning now to consider FIGS. 7 and 8, a fourth embodiment of the present invention is illustrated which represents a further variation of the embodiment illustrated in FIGS. 5 and 6. In this arrangement, the air-bag 5 is again provided with a plurality of internal eyelets. In particular, in the arrangement illustrated in FIGS. 7 and 8, four eyelets 25, 26, 27, 28 are this time provided. The first eyelet 25 is located in generally the same region as the first eyelet 21 of the arrangement illustrated in FIGS. 5 and 6. The second and third eyelets 26, 27 are both located generally in the region of the restrainable part 13 of the air-bag, with the fourth eyelet 28 being located in a region of the air-bag which will, at an early stage during deployment of the air-bag, become pressed against the windscreen 8.

In this arrangement, the restraint element 11 is again connected to the air-bag by the tether 14, but in this arrangement, the tether 14 is threaded through the eyelets in the opposite direction to the arrangements of FIGS. 5 and 6. In particular, the tether 14 passes first through the first eyelet 25, and then passes through the restraint 11 whereafter the tether passes through the fourth eyelet 28. From the fourth eyelet 28, the tether passes again through the restraint element 11 before passing through the third eyelet 27, whereafter the tether passes through the restraint element again before passing through the second eyelet 26. The first end 15 of the tether 14 thereafter is connected to the forwardmost part of the restraint element 11. The arrangement of FIGS. 7 and 8 behaves generally similar to that of the arrangement illustrated in FIGS. 5 and 6 during the initial stages of deployment and in the event that the folded part 9 of the air-bag is prevented from unfolding completely due to the proximity of an "out-of-position" occupant. However, in the event that the folded part 9 of the air-bag is allowed to unfold more fully, for example where the occupant is adopting a "ordinary" position with respect to the dashboard 3, then as the second end 16 of the tether 14 becomes released from the folds of the air-bag, the tether allows a slightly modified forward movement of the restrainable part 13 of the air-bag as indicated by arrow 29. This is by virtue of the opposite threading direction of the tether through the eyelets.

Figure 9:
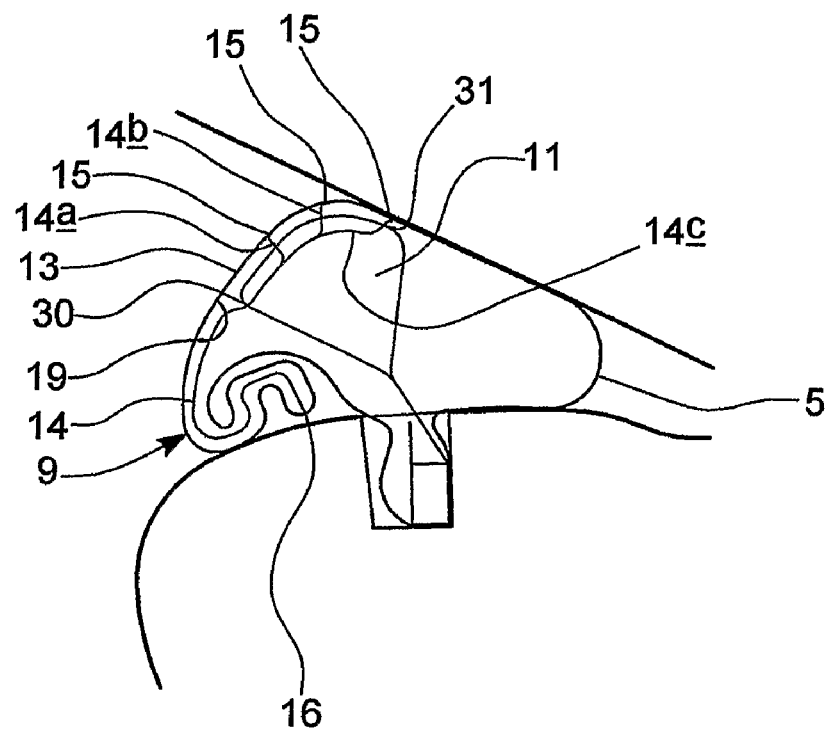
FIG. 9 is a schematic cross-sectional illustration showing a fifth embodiment of the present invention during an initial stage of deployment, in which an air-bag is partially inflated.
Figure 10:
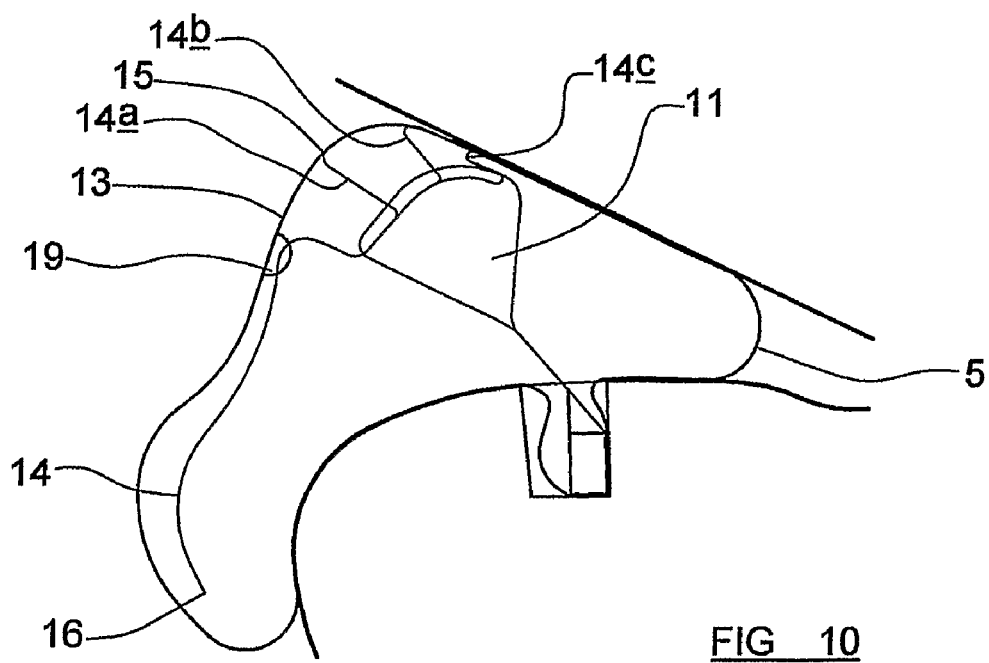
FIG. 10 is a view corresponding generally to FIG. 9, illustrating a subsequent stage of deployment, in which the air-bag is more fully inflated.

The embodiment illustrated in FIGS. 9 and 10 is, in certain respects, generally similar to the embodiment illustrated in FIGS. 3 and 4, although the form of connection between the tether 14 and the restraint element 11 is slightly different. In this arrangement, the tether 14 has three distinct branches, each of which are interconnected at the second end 16 of the tether. Each of the branches of the tether pass through the eyelet 19, and then pass through a forwardmost region 30 of the restraint element 11. From here, the three branches of the tether split, but continue to extend within the restraint element 11. The first branch 14a of the tether then passes back through the restraint element and the second branch 14b continues a little way within the restraint element 11 before also passing back through the restraint element 11. The third branch 14c passes back through the restraint element 11 in an uppermost region 31. The first end 15 of each branch of the tether is directly connected to the inner surface of the air-bag 35.

As illustrated in FIG. 9, if the folded part 9 of the air-bag is prevented from substantially complete unfolding, then the second end 16 of the tether remains trapped between the folds of the air-bag and the tether 14 hence again serves its function of restraining the restrainable part of the air-bag 13 from further movement towards the seat occupant.

FIG. 10 illustrates the situation in which the folded part 9 of the air-bag has been allowed to become substantially unfolded such that the second end 16 of the tether 14 becomes released and hence each branch 14a, 14b, 14c of the tether 14 is allowed to pay out through the eyelet 19 simultaneously.

Figure 11:
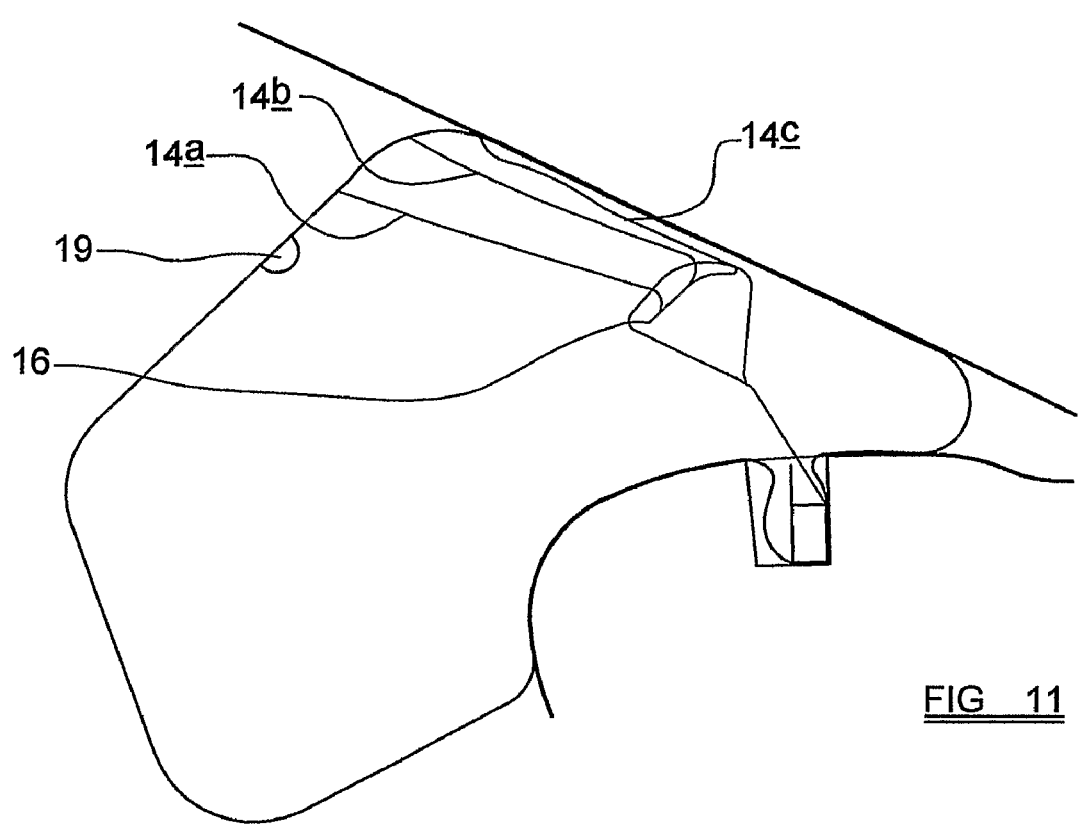
FIG. 11 is a view corresponding generally to FIG. 10 illustrating a subsequent stage of deployment in which the air-bag is substantially fully inflated.

FIG. 11 shows a subsequent stage of inflation in which each branch of the tether has become completely released from the eyelet 19, allowing the restrainable region 13 to move away from the forwardmost point of the restraint element.

Figure 12:
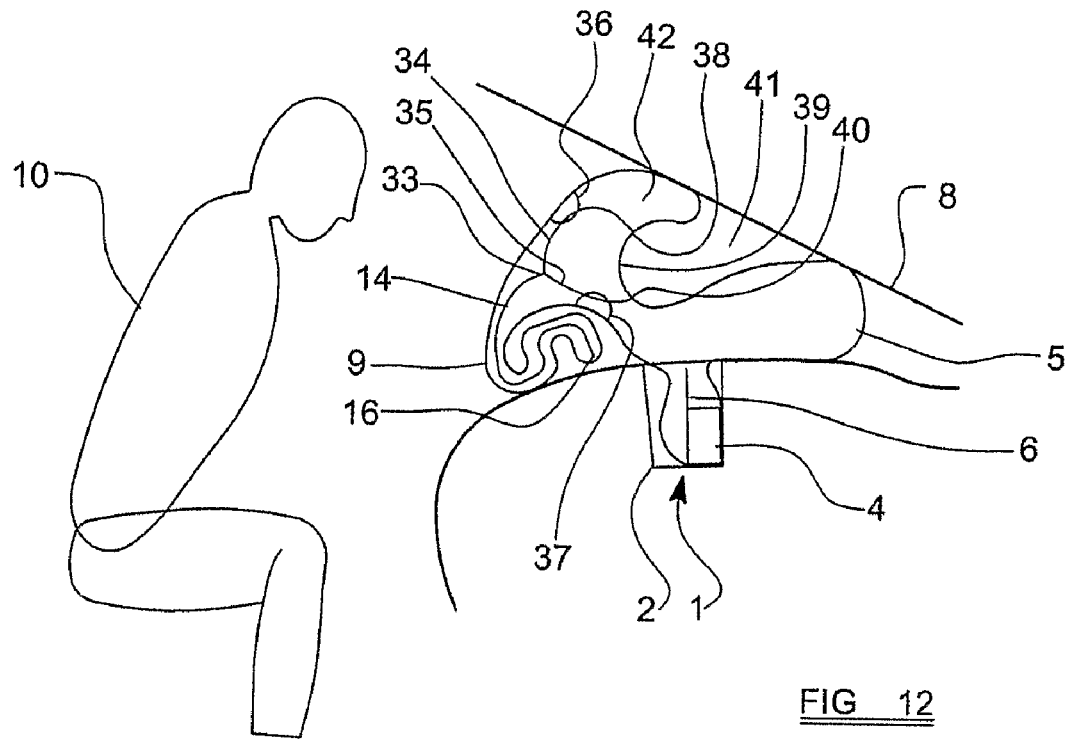
FIG. 12 is a schematic cross-sectional illustration showing a sixth embodiment of the present invention during an initial stage of deployment, in which an air-bag is partially inflated.
Figure 13:
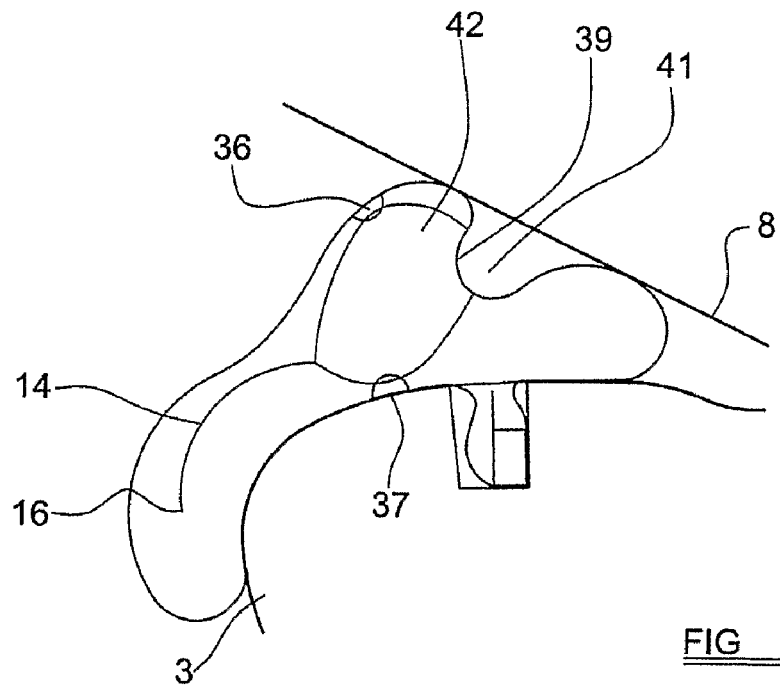
FIG. 13 is a view corresponding generally to FIG. 11 illustrating a subsequent stage of deployment, in which the air-bag is substantially fully inflated.

FIGS. 12 and 13 illustrate a further embodiment of the present invention in which the restraint element 11 of the previous embodiments is done away with entirely. In this arrangement, the second end 16 of the tether 14 is, once again, initially trapped between the folds of the folded part 9 of the air-bag 5. At a point, indicated by reference numeral 33, spaced from the second end 16, the tether 14 is bifurcated so as to form two discrete branches 34,35 (although it should be appreciated that alternative embodiments could be provided with more than two branches in this manner). The first branch 34 extends from the bifurcation point 33, through a first eyelet formed on the interior surface of a generally forwardly-located part of the air-bag. The second branch 35 extends from the bifurcation point 33 and passes through a second eyelet 37 which is formed on the interior surface of a lower part of the air-bag 5. The first branch 34 of the tether terminates at a point 38 where the end of the branch is directly connected to the inner surface of a restrainable part 39 of the air-bag. The second branch 35 of the tether terminates at a point 40 where the end of the branch is connected directly to a lower point in the region of the restrainable part 39. As will be appreciated, the restrainable part 39 of the air-bag illustrated in FIG. 12 is directed generally away from the vehicle occupant 10 and generally faces the windscreen 8. The connection points 38, 40 between the air-bag and the branches 34, 35 of the tether are located relatively close to one another so as to restrain the air-bag over a localised restrainable part 39.

Whilst FIG. 12 illustrates an initial deployment stage of this embodiment, it should be appreciated that were the occupant 10 to be located "out-of-position" so as to be positioned very close to the deploying air-bag, then the initially folded part 9 would not be allowed to unfold significantly further than as illustrated in FIG. 12. In this condition, the second end 16 of the tether 14 remains trapped within the folds of the folded part 9 and so the two branches 34,35 of the tether 14 serve to restrain and prevent substantial movement of the localised region 39 of the air-bag, under the force of gas pressure from the inflator 4, towards the windscreen 8. However, the neighbouring regions of the air-bag are not so restrained and so are allowed to inflate towards the windscreen 8. A condition is thus reached, as illustrated in FIG. 12, in which the upper region of the air-bag has a generally re-entrant form in which an un-inflated "bubble" is formed. This un-inflated "bubble" 41 serves to weaken the resistance to impact from the occupant 10 of the head-impact area 42 of the air-bag 5. This is thus effective to prevent significant injury to an "out-of-position" occupant which might be caused by over-inflation of the head-impact area 42.

However, if the folded part 9 of the air-bag is allowed to substantially unfold as illustrated in FIG. 13, which would be the case where the occupant 10 is located in an "ordinary" position relative to the dashboard 3, then the second end 16 of the tether 14 once again becomes released, thereby allowing the two branches 34,25 of the tether to pay out through the respective eyelets 36,37, thereby allowing the localised restrainable region 39 of the air-bag to advance towards the windscreen 8. This reduces the size of the in-inflated "bubble" behind the head impact area 42, thereby strengthening the resistance of the head impact area 42 to impact by the occupant 10.

Whilst the present invention has been described above with specific reference to the second end 16 of the tether 14 being initially trapped between the folds of a folded part 9 of an air-bag, it should be appreciated that variants of the invention are envisaged in which the second end 16 of a tether might instead be trapped between the rolls of a rolled part of an air-bag.

When used in this specification and claims, the terms "comprises" and "comprising" and variations thereof mean that the specified features, steps or integers are included. The terms are not to be interpreted to exclude the presence of other features, steps or components.

The invention claimed is:

1. A safety arrangement for a motor vehicle, the safety arrangement comprising: an airbag module having an inflatable airbag in fluid communication with an inflator configured to inflate the airbag, the airbag provided with at least one internal tether having a first end and a second end, a first part of the tether proximate the first end being connected either directly or indirectly to a restrainable part of the airbag, at least part of the airbag being initially folded or rolled to form folds or rolls between which the second end of the tether is trapped, the second end being a terminal end of the tether free from connection with the airbag apart from the folds or rolls which initially trap the second end, the safety arrangement being such that, upon inflation of the airbag, the tether serves to restrain said restrainable part of the airbag until such time as the folded or rolled part of the airbag becomes sufficiently unfolded or unrolled to release the second end of the tether.

2. The safety arrangement according to claim 1, provided in the motor vehicle and configured such that, upon inflation of the airbag, the restrainable part of the airbag will lie substantially adjacent a windscreen of the vehicle, and the folded or rolled part of the airbag will move towards a front-seat of the vehicle, as the folded or rolled part of the airbag unfolds or unrolls.

3. The safety arrangement according to claim 1, wherein initial inflation of the airbag to a partially inflated condition automatically releases the second end of the tether.

4. The safety arrangement according to claim 1, wherein the first part of the tether is indirectly connected to the restrainable part of the airbag via a restraint element, the restraint element being attached to the first end of the tether and to the airbag.

5. The safety arrangement according to claim 4, wherein the restraint element includes a panel secured to the airbag in a region of the restrainable part.

6. The safety arrangement according to claim 4, wherein the restraint element extends inwardly of the airbag from the restrainable part of the airbag and is secured to a fixed part of the airbag module.

7. The safety arrangement according to claim 4, wherein the restraint element extends inwardly of the airbag from the restrainable part of the airbag to the first end of the tether.

8. The safety arrangement according to claim 7, wherein the tether passes through a fixed guide aperture formed through part of the airbag module.

9. The safety arrangement according to claim 1, wherein the first part of the tether is connected directly to the restrainable part of the airbag.

10. The safety arrangement according to claim 9, wherein the first part of the tether is bifurcated so as to define two branches, each said branch having a respective branch end connected directly to the restrainable part of the airbag.

11. The safety arrangement according to claim 1, wherein the airbag is provided with at least one eyelet on an inner surface thereof, the tether passing through the at least one eyelet.

12. The safety arrangement according to claim 11, wherein the airbag is provided with a plurality of said eyelets on the inner surface thereof, the tether connected to a restraint element through the plurality of eyelets.

13. The safety arrangement according to claim 11, wherein the at least one eyelet includes a plurality of eyelets, wherein the first part of the tether is bifurcated so as to define two branches, each said branch having a respective branch end connected directly to the restrainable part of the airbag, wherein each said branch passes through a respective eyelet of the plurality of eyelets.

14. A safety arrangement for a motor vehicle comprising:
an airbag deployable from a stored condition to a fully inflated condition, the airbag defining folds or rolls in the stored condition, which unfold or unroll as the airbag is inflated; and
at least one tether disposed with the airbag, the at least one tether having a first end and a second end, the first end being connected at least indirectly to a restrainable part of the airbag, the second end of the tether being a terminal end of the tether, the folds or rolls of the airbag temporarily retaining the second end of the tether such that the second end of the tether is otherwise not secured to any structure and is automatically released from the folds or rolls of the airbag upon inflation of the airbag from the stored condition to the fully inflated condition.

15. The safety arrangement according to claim 14, wherein the first part of the tether is indirectly connected to the restrainable part of the airbag via a restraint element, the restraint element being attached to the first end of the tether and to the airbag.

16. The safety arrangement according to claim 14, further comprising an inflator in fluid communication with the airbag for inflating the airbag from the stored condition to the fully inflated condition.

17. The safety arrangement according to claim 16, wherein initial inflation of the airbag to a partially inflated condition operates to automatically release the second end of the tether.

18. A safety arrangement for a motor vehicle comprising:
an inflatable airbag;
an inflator in fluid communication for inflating the airbag from a stored condition to a fully inflated condition; and
a tether disposed within the airbag, the tether having a secured end and a terminal end, the secured end being connected at least indirectly to a restrainable part of the airbag, the terminal end being temporarily secured relative to the airbag solely through folds or rolls of the airbag in the stored condition such that the terminal end of the tether is otherwise not secured to any structure and is automatically released by the folds or rolls of the airbag upon inflation of the airbag from the stored condition to the fully inflated condition in response to unfolding or unrolling of the folds or rolls.

* * * * *